United States Patent [19]
Li et al.

[11] Patent Number: 5,699,523
[45] Date of Patent: Dec. 16, 1997

[54] METHOD AND APPARATUS FOR COMMUNICATION BETWEEN AT LEAST ONE CLIENT AND AT LEAST ONE SERVER

[75] Inventors: Jianzhong Li, Chatenay-Malabry; Jean-Philippe Brunon, Paris, both of France

[73] Assignee: Bull S.A., Puteaux, France

[21] Appl. No.: 658,308

[22] Filed: Jun. 5, 1996

Related U.S. Application Data

[63] Continuation of Ser. No. 208,862, Mar. 11, 1994, abandoned.

[30] Foreign Application Priority Data

Mar. 12, 1993 [FR] France ............................. 93 02903

[51] Int. Cl.$^6$ ........................................................ G06F 13/00
[52] U.S. Cl. .......................... 395/200.15; 395/200.19; 395/650
[58] Field of Search .......................... 395/200.15, 200.19, 395/650

[56] References Cited

U.S. PATENT DOCUMENTS

| | | | |
|---|---|---|---|
| 5,230,051 | 7/1993 | Quan | 395/700 |
| 5,265,250 | 11/1993 | Andrade et al. | 395/650 |
| 5,329,619 | 7/1994 | Page et al. | 395/200 |
| 5,355,506 | 10/1994 | Mariani | 395/800 |
| 5,390,328 | 2/1995 | Frey et al. | 395/650 |

*Primary Examiner*—Mehmet B. Geckil
*Attorney, Agent, or Firm*—Kerkam, Stowell, Kondracki & Clarke, P.C.; Edward J. Kondracki

[57] ABSTRACT

A device for communication between at least one client and at least one server who are exchanging messages, characterized in that it includes a router which routes the messages between at least one client and at least one server with the aid of three message queues, including a first queue assigned to the router assuring the storage of the messages from clients or servers; a second queue assigned to the server enabling the reading of messages of requests formulated to the server; a third queue assigned to the client enabling the reading of response messages.

26 Claims, 6 Drawing Sheets

METHOD AND APPARATUS FOR COMMUNICATION BETWEEN AT LEAST ONE CLIENT AND AT LEAST ONE SERVER

This is a continuation of application Ser. No. 08/208,862, filed Mar. 11, 1994 now abandoned.

BACKGROUND OF THE INVENTION

The present invention relates to a router device between a client and a server, the method for using the device, and the use of the device.

In a distributed architecture that connects workstations of the microcomputer or personal computer (PC) type with a central computer (host), for example of the UNIX type, the processes executed by the computer (host) can be classified as server and client processes. The servers enable access to the data of the host computer and wait for a request from a client, process it and transmit a response. The clients send a request to a server and wait for a response therefrom; they may be of the local client type, implanted in the host computer, or a remote client communicating with the host computer by demons (DAEMON).

In such devices, when a client located in a PC sends a request to the server, either the PC waits for the response and does nothing else, or the architecture is designed to allow the PC access to some other server during the period of waiting for the response from the first server. In the latter case, a physical link must necessarily be made with the second server. Thus, the designer must provide numerous physical links. Moreover, if a different client at a different station seeks access to the same server as that used by the first client, it cannot do so until after the server has furnished its response to the first client, and on the condition that the second client is connected to the first server. Hence, single-link devices do not allow optimal use of the machine, and multi-link devices require a great many links.

OBJECT OF THE INVENTION

A first object of the invention is to provide a device which enables several servers to communicate with several clients.

This and other objects and advantages are achieved by providing a device for communication between at least one client and at least one server who are exchanging messages, wherein the device includes a router which routes the messages between at least one client and at least one server with the aid of three message queues as follows:

a first queue assigned to the router assuring the storage of the messages from clients or servers;

a second queue assigned to the server enabling the reading of messages of requests formulated to the server;

a third queue assigned to the client enabling the reading of response messages.

In another feature of the present invention, the client generates a message identifier for the router.

In another feature, the router generates a message identifier for the server and the client.

In another feature, the server generates a message identifier for the router.

In another feature, the message includes a field of two eight-bit bytes indicating whether the communication is synchronous or asynchronous and a field of two eight-bit bytes to indicate whether the message is a response or a request, by assigning this field a value 0 or a value other than 0, respectively.

In another feature, the message includes a field of four eight-bit bytes identifying the user who sent the message.

In another feature, the message includes a field of four eight-bit bytes identifying the addressee of the message.

Another object of the present invention is to provide a method for processing the synchronous requests employed by the device.

This object is achieved by providing a method for processing synchronous requests between at least one client and at least one server in dialog through a router device wherein the method includes the following steps:

the client sends a request message to the queue of the router;

the router sends a message with an identifier to the queue of the server;

after receiving the response in its queue the router sends an acknowledgement message to the client with an identifier enabling the client to retrieve the response in the queue of the router.

In another feature of the present invention, the client is itself a server.

In another feature, the server is a client of a different server in a synchronous or asynchronous method.

In another feature, the message includes a field of two eight-bit bytes indicating whether the communication is synchronous, and a field of two eight-bit bytes to indicate whether the message is a response or a request.

In another feature, the message includes a field of four eight-bit bytes identifying the sender of the message.

In another feature, the message includes a field of four eight-bit bytes identifying the addressee of the message.

Another object of the present invention is to provide a method for processing the asynchronous requests that use the present device.

This object is achieved by providing a method for processing asynchronous requests between at least one client and one server in dialog through a router device wherein the method includes the following steps:

the client sends a request message to the queue of the router with a first identifier;

the router sends a message with a second identifier to the queue of the server and acknowledges to the client reception of the request message, and the server acknowledges reception to the router by sending the second identifier to the queue of the router;

when the server has processed the response, it sends a message with the second identifier to the queue of the router.

In another feature of the present invention, when the server has sent an identifier and the response message to the queue of the router, the router sends the message to the queue of the message box server, which sends acknowledgement to the router, which sends acknowledgement to the server.

In another feature, the client retrieves the response by sending a message (fetch-message) of request to the queue of the router, which transmits this message to the queue of the message box server, the message box server sending the response to the queue of the router, which retransmits the message to the client.

In another feature, the client sends a query message to the queue of the router, and the router compares the value of the message identifier with the value −1, in order to either calculate a new message identifier (second identifier) which will be used in the other steps if the value was −1, or to retransmit the identifier received if the value was other than −1.

In another feature, the message includes a field of two eight-bit bytes indicating whether the communication is synchronous or asynchronous and a field of two eight-bit bytes to indicate whether the message is a response or a request.

In another feature, the message includes a field of four eight-bit bytes for identification of the sender of the message.

In another feature, the message includes a field of four eight-bit bytes for identification of the addressee of the message.

BRIEF DESCRIPTION OF THE DRAWING

Further characteristics and advantages of the present invention will become more apparent from the ensuing detailed description, taken in conjunction with the drawings, in which.

DETAILED DESCRIPTION OF THE PREFERRED EMBODIMENTS

Figure 1:
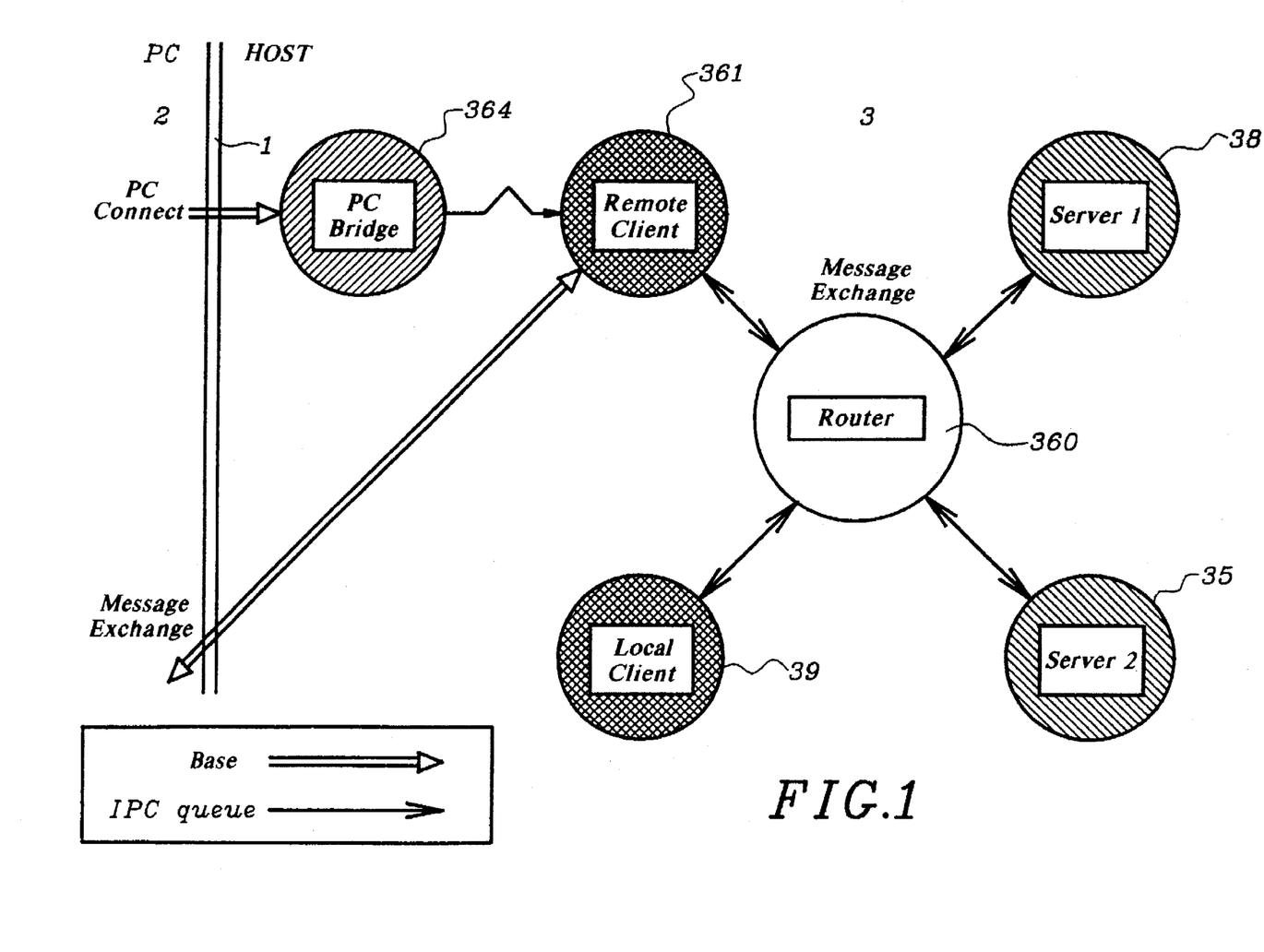
FIG. 1 shows a schematic view of the device of the invention enabling the employment of the method.

The routing device according to the invention is shown in FIG. 1, and it makes it possible to put work stations (2), such as PCs, into communication with a host computer, for example of the UNIX type, by way of a communication link (1).

The host computer 3 communicates with one or more PCs through a bridge (PC bridge) (364), each dedicated to one PC. Accordingly, there are as many bridges as there are PCs. In the host computer (3), this bridge generates a remote client process (361) by way of a primitive "fork". This communicate is based on the connect, disconnect, send and receive functions.

The device may also include local clients (39), which send requests to one or more servers and wait for the response from the servers. These local clients (39) are processes started by the host computer (3), as opposed to remote clients (361), which are processes initialized by a workstation (2) and created in the host computer (3). The servers (38, 35) enable access to the data of the computer and wait for the queries from the clients. The servers process these queries and send the response to the client, going through a router (360), which is the heart of the message system and whose main role is to route the messages from clients to the servers and vice versa.

The router (360) has no need to know the contents of the message or its type, but rather only its origin and its destination. The advantage of the router (360) is that it simplifies and generalizes the concept of ceding (connection), assures that the asynchronous queries are sent to the addressee, facilitates the generation of message identifiers, thus making the use of semaphores unnecessary, and accordingly makes it possible to set up a low-level, flexible and powerful administration system.

In the central computer (3), the messages between the process are exchanged by using interprocess communications message queues. The device of FIG. 1 can employ either a synchronous query processing process shown in FIG. 2, or an asynchronous query processing process shown in FIGS. 3A-3C using the queues.

The messages exchanged in the course of the communications have the structure shown in appendix (1) and include a first message identification field (MessageId) made up of four eight-bit bytes; a second field (sessionId) identifying the client session, written at the connection by the router, including four eight-bit bytes; a third field (srvSessionId) identifying the server session, written at the connection by the router and including four eight-bit bytes; a fourth field (isRequest) of two eight-bit bytes to indicate whether the message is a query or a response; a fifth field (synchronous) of two eight-bit bytes to indicate whether a synchronous or asynchronous exchange procedure is involved; a sixth field (type) to indicate whether a query or a response is involved, this field beign formed of four eight-bit bytes; a seventh field (priority) of four eight-bit bytes, to indicate the degree of priority of the query; an eighth field (status) of four eight-bit bytes to indicate the status via a return code, which is zero if there is no error; a ninth field (senderUserId) identifying the sender of the message, formed of four eight-bit bytes; a tenth field (destUserId) formed of four eight-bit bytes identifying the addressee of the message; an eleventh field (tWFfileName), including the file name indicated in 128 eight-bit bytes; and an administrative portion that includes the creation date (tWFdate) in 12 eight-bit bytes, the central processing unit time used by the query (cpuTime) in four eight-bit bytes, and the real time required for the query (realTime) in four other eight-bit bytes; an application-specific portion which may optionally be omitted, is made up of four eight-bit bytes, for transmitting the very-special-level data, and an unused portion made up of four eight-bit bytes for further uses. The complete message comprises 256 eight-bit bytes.

Figure 2:
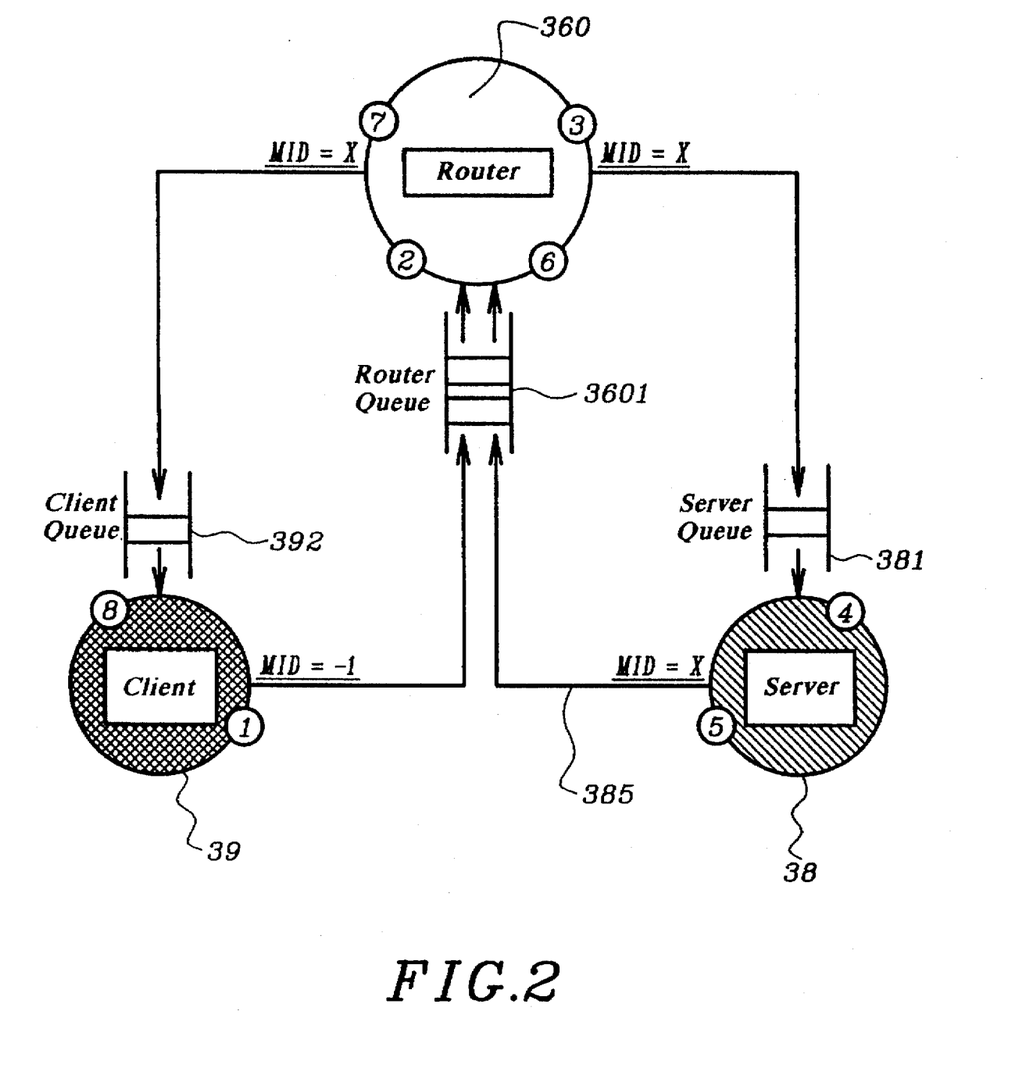
FIG. 2 shows a schematic view explaining a first variant of employment of the method.

In a synchronous exchange procedure, the client, in a first step, sends the message to the queue (3601) of the router (360), which as shown in Appendix 2A looks for whether the message identifier has the value "-1", which in this case means that the client is in the process of sending a query for the first time. In that case, the router (360) calculates a new message identifier, as indicated in line 3603 of Appendix 2A. Next, the router looks at whether the message is a query, by comparing the value "0" with the contents of the corresponding field in the message; if the field has the value "0", it is a response, and conversely, if the value is positive or negative, a query is involved, as indicated in line 3604 in Appendix 2A or 2B. Next, it looks at the field involving the identification of the destination user (line 3605, Appendix 2A). With knowledge of this information, the router sends the message, with a new identifier X that it has calculated, to the queue (381) of the server (38), which is the destination indicated in the message; see line 3606, Appendix 2B. When the server (38) has prepared the response, it sends the message (385) with the identifier X to the queue (3601) of the router (360), which upon reception of the message transmits it with the identifier X to the queue (392) of the client (39). This corresponds to steps 3608, 3610 in Appendix 2B.

Figure 3A:
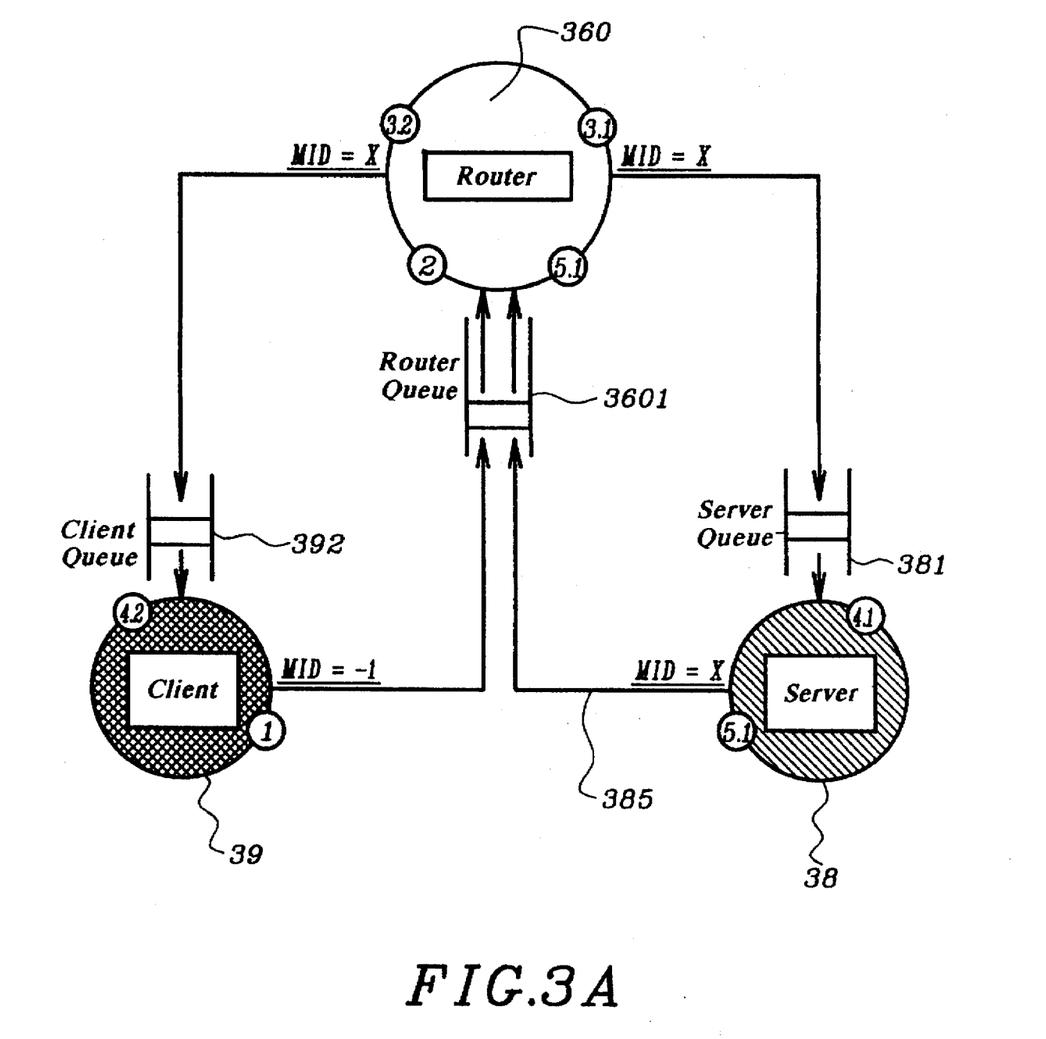
FIGS. 3A, 3B, 3C show a schematic view of another variant of employment of the method.

In the case where the query is asynchronous, the sequence of exchanges between the client (39), the router queue (3601), the queue (381) of the server (38), and the client queue (392) differs in that the server (38) simply sends an acknowledgement of reception with the identification number to the queue of the router 3601, and the router (360), at the same time that it sends the message to the server (38) with its identifier X, sends the same identifier X to the queue (392) of the client (39). This succession of steps is shown in FIG. 3A.

Figure 3B:
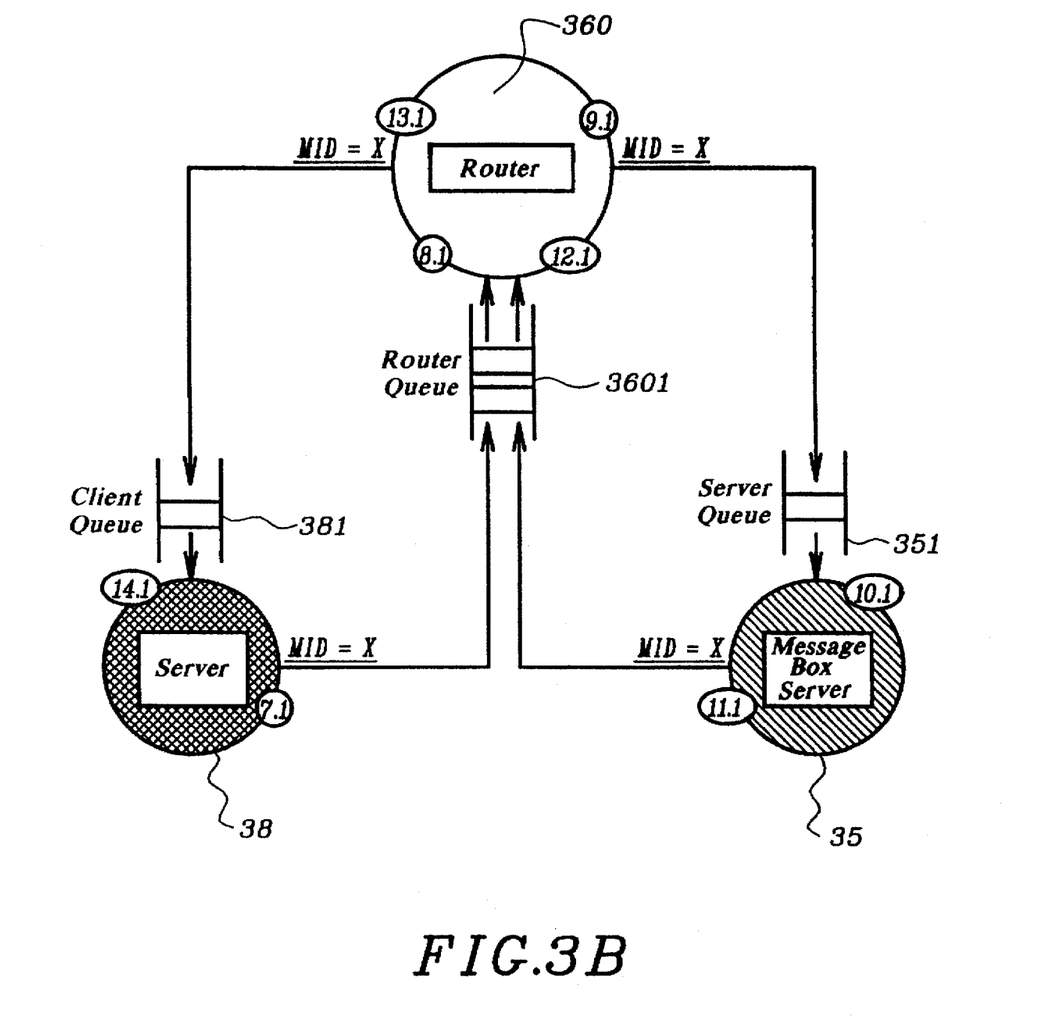

When the server (38) has received the question, it in turn becomes a client of the message box (35), in the case where a response to the client message is necessary. In that case, the server (38) sends a message with a value other than "–1" as the identifier X to the queue (3601) of the router. When the router (360) processes the message of this queue, it confirms that the message identifier is other than "–1" and does not modify it. The router (360) sends the message directly in the direction of the queue 351 associated with the message box server (35). The message box server (35) sends an acknowledgement with the identifier of the message to the queue (3601) of the router (360), which transmits the acknowledgement to the queue (381) of the client, which in this case is the queue (381) of the server (38). This step corresponds to step 3612 of Appendix 2B, in which the router makes the acknowledgement for the client that the client is a normal client or a server.

Figure 3C:
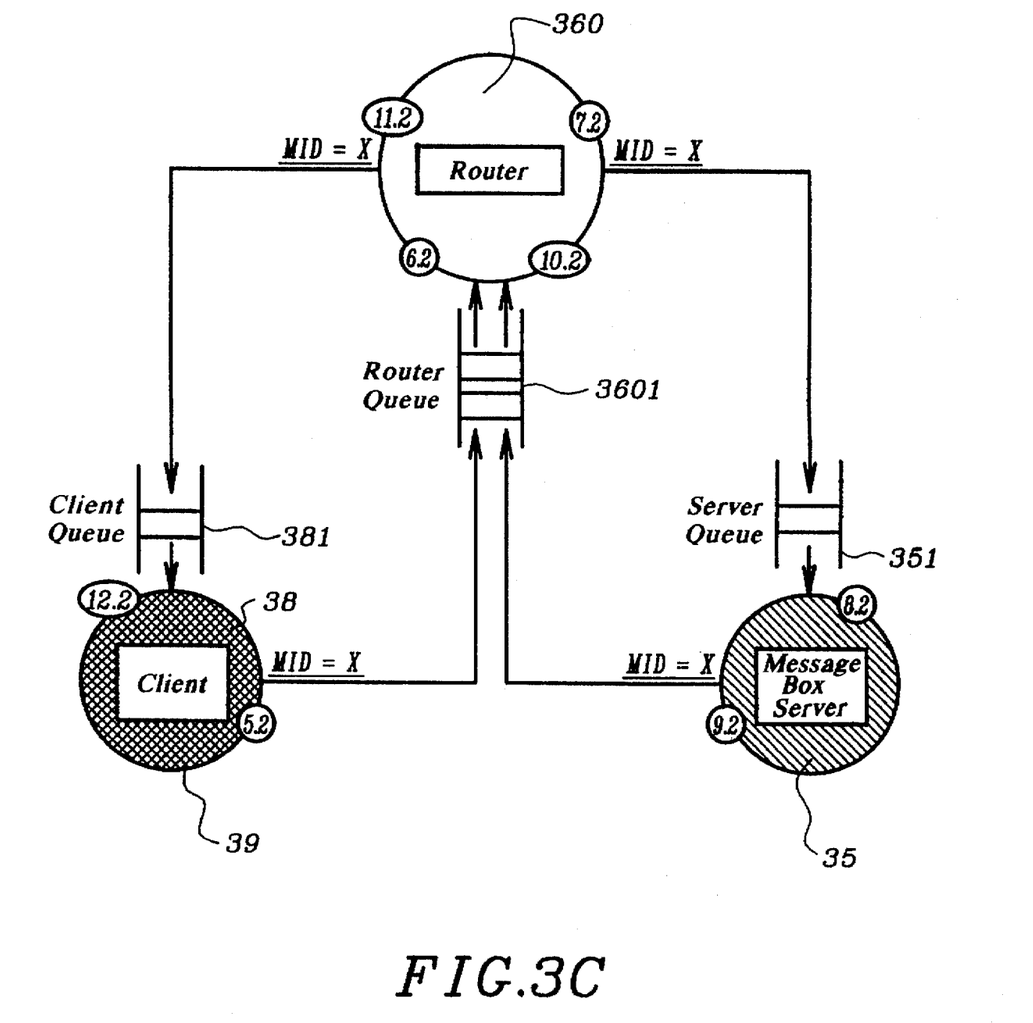

FIG. 3C shows the process when the client (39) wishes to retrieve the response by sending a query message with an identifier X to the message box server in the form of an order (fetch-message) to read the messages from the server of the message box (35). The message sent by the client (38) is stored in step 6.2 in the queue (3601) of the router, which in step 7.2 sends the message to the queue (351) of the message box server (35). The message box server sends the response in step 9.2 to the queue (3601) of the router, which in step 10.2 processes this message and sends it in step 11.2 to the queue (381) of the client (38).

Appendix 3C shows the function of a server which in the first step 3810 receives a query in message form, in the second step 3811 processes the query by making the declaration of input and output parameters, by finding the input parameters in the message in step 3812, calling the programming interface server of the application in step 3813, and in step 3814 storing the output parameters in the message. Once the query has been processed, if a synchronous response is requested, as shown in step 3815, the server than sends the response after having verified that the bits of the field indicating whether the response is to be synchronous had the value of 0.

In step 3816, if after verification of the value of the bits of the synchronous field the server confirms that the response is asynchronous, it verifies the request (is-request) to look for whether a response is necessary. If the value is also 0, this means that the router and the client are waiting for a response, and in that case the server writes the message in its queue and in the next step sends an acknowledgement of reception to the router.

The device thus designed and the method using it, making it possible to avoid duplication of servers to enable access by multiple clients and also make it possible to avoid duplication of the links among a number of servers and the same client, in order to allow the client access to the various servers.

Finally, the method, because it is balanced and because it includes three message queues, makes it possible to know, in the case where a blockage occurs, why the blockage took place.

Figure 4:
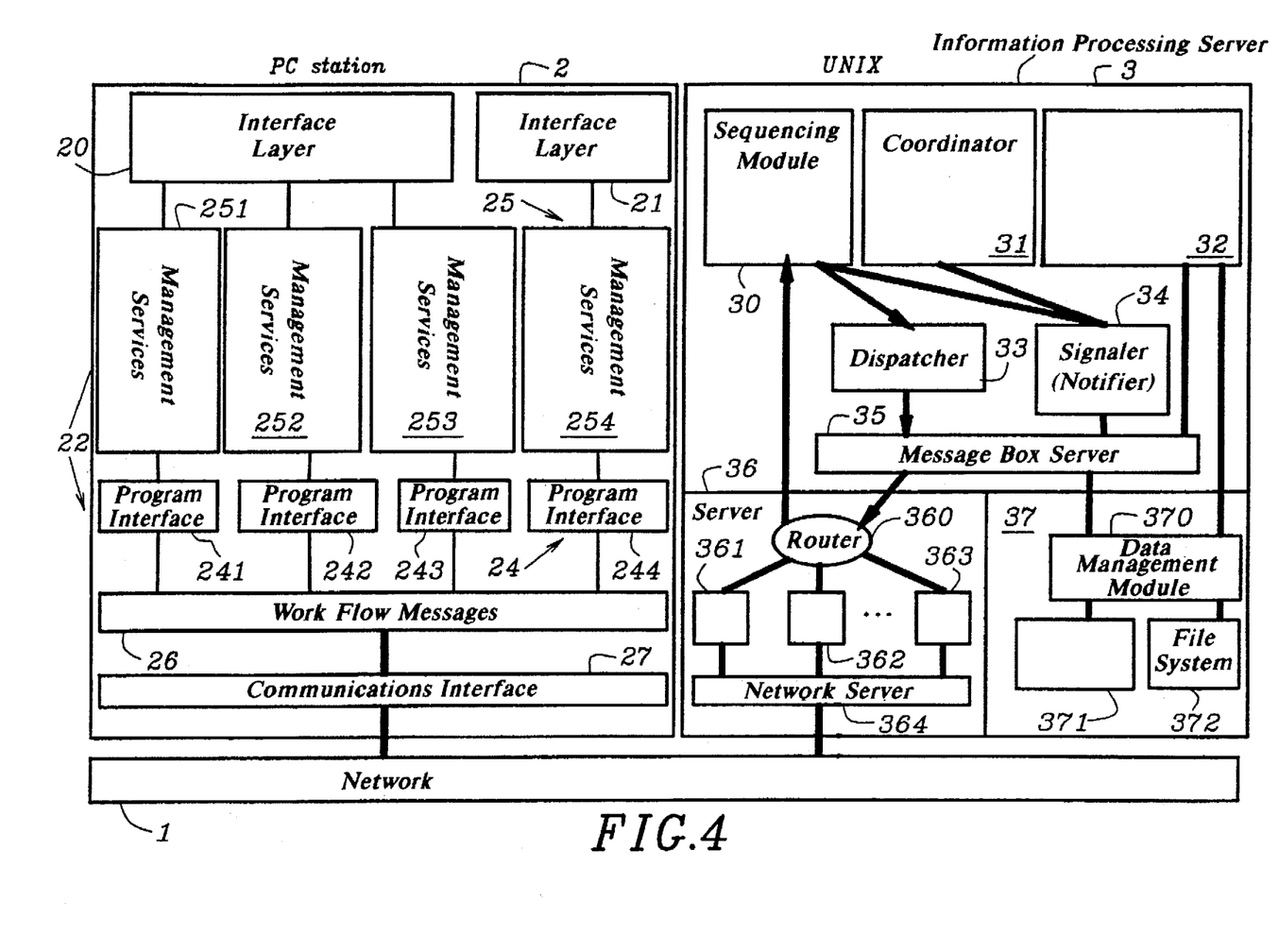
FIG. 4 shows a schematic view of a transactional processing system using the device and the method of the invention.

One particularly advantageous use of the invention may be made in a transactional processing system between an information processing server and a plurality of work stations, as shown in FIG. 4.

FIG. 4 shows a transactional processing system between an information processing server (3) using processing data stored in a relational data base of an information processing server (3), for instance of the UNIX type, and communicating with workstations (1), for example of the PC type, in which the work of an application that proceeds within the context of activities is done by the user of the workstation.

The server (3) includes a set of modules (30–37), which initialize and coordinate the activities. The term "activity" should be understood to mean the body of a work step, of a procedure, that is, a basic work unit, which may be a sequential set of primitive actions executed by a single actor.

The transactional processing system aids in defining, executing, coordinating and commanding the work flow among organizations or work groups, based on a description of office tasks, which may be described as recurrent structured tasks, known as procedures, in which the basic work elements are called activities and which must be executed by various individuals, called actors, in a certain sequence.

An actor consists of a unique identification of the actor (usrid) furnished by the system, an actor name (name), a first name of the actor (firstName), a unique session opening word (loginName), a password (password), and a label (alias).

A procedure is a predefined set of work steps in accordance with partial sequencing of these steps. A work step is formed of a header (identification, precedence, etc.) and a body (activity), which constitutes the actual work to be done. Various steps of a procedure may be done by various persons, or groups of persons. In certain cases, a plurality of steps of a procedure may be done at the same time or in any arbitrary order. In general, a procedure is a partially ordered set of steps, that is, in which all the steps need not necessarily be done sequentially and in which loops are authorized, or a completely ordered set. The procedures have attributes, in conventional fashion, such as the name and the person responsible associated with the procedure.

A job is the command location for a particular execution of a procedure. In some contexts, the job is called a transaction. Jobs have parameters, such as status, initiator, and history.

A role consists of designating an actor or a group of actors who act as a base for access commands and execution commands. An actor may play several actor roles (role of actor) in an organization. An actor is a person, program or entity that can perform the roles to be executed and can be responsible for these roles or be associated to a certain extent with the activities and procedure. The attributes or access possibilities can be associated with the actors and with the roles.

A role is defined by the following: a unique word (rid) identifying the role, the role name (name), and the description of the role. The role of the actor includes: the actor identification (usrid) and the role identification (rid).

Other parameters or attributes and structures may be associated to create an organizational model intended to better manage the work flow.

The architecture, at the level of the software for transactional processing of the work flow, making up the system can be broken down into a certain number of modules (30–37, FIG. 4). The models become active when a job and/or an activity is begun or completed. An sequencing module 30 is activated by an activity completion message, an activity exception, or the creation of a job.

In all cases, the job is started by an arbitrary process which sends a message of the create a job type to the sequencing module (30) of the server (3). The parameters of this message include the priority of the job, the deadline, the name of the procedure, and the initializing parameters.

The sequencing module (30), through the capability of job creation, creates the job, assigns it a unique number, defines the status information for this job, and performs various initializations.

The finalization work is also done by the sequencer (30) through its capability of job completion when all the activities for a job have been done. The sequencer verifies all the predecessors of all the possible successors of a completed activity.

If the activity completed was a decision activity, then the sequencer examines the variable resulting from this activity. If one or more successors are validated, a message is sent to a dispatcher module (33), with which the sequencer dialogs.

The sequencer module dialogs with a dispatcher module (33) and a signaler (notifier) module (34). The sequencer marks the new tasks which are created with the status "todispatch" and notifies the dispatcher of this by placing a message in a message box (35).

The dispatcher module (33) has three main functions:

a) assigning the tasks that have just been created by the sequencer to a user;

b) assigning a task that has just been rejected to a new user;

c) performing the distribution and circulation of an activity among the users.

The dispatcher module (33) is the first module that drives and is driven by the actor and the role entities. In its third function, for a given activity, the dispatcher (33) establishes a correspondence with a role and with one or more actors.

The notifier module (34) keeps a record of clocked events and notifies the correct receivers at the appropriate moment.

Two clocking utilities are provided in the notifier module (34), that is, the calling capability and the delaying capability: the first, for instance to impose a time limit for the execution of a specific activity and to send a message of warning when the stop time has expired, while the second makes it possible to delay sending a message for a certain period of time, for instance in order to ask an actor to do a certain work after a certain delay.

The notifier (34) also receives information from the coordinator (31), which keeps track of what takes place in the work flow management system. The coordinator furnishes the capabilities of internal management control in order to preserve a record of significant events and to store the updated journal files, the ways of interrogating the system about the various statuses (questions such as who does what, what is the progress of a specific job, how many jobs are in progress, and quesions about the mean execution time for a task, job history, current status of a job, information obtained by a predetermined job, files for executing a given activity in the course of a given procedure, conflicts within a given job, etc.), the possibility of affecting the progress of the jobs (suspend, resume, cancel, reassign, etc.), and the means for keeping a history by archiving.

The dispatcher (33) and the notifier (34) exchange signals with the message box (35), which serves to preserve all the asynchronous messages. These messages may be activities assigned to actors, warning messages generated by the notifier (34), messages between actors, etc.

When a client query is asynchronous, the result is memorized as a message in the message box, through the message box server. The only way of accessing the message box is through the message box server (35).

The message box is made up principally of two data tables of a relational data base (31), such as "ORACLE". The first, called MSG-BOX-DESC, which contains the description of the messages, such as a unique identifier, the type, etc. The second table is called MSG-BOX-BROADCAST, which is used to memorize the addresses of the messages and the other information, such as the statuses of the messages. It is important to note that a message may be addressed to a plurality of addresses, and that as a consequence a second table, MSG-BOX-BROADCAST, must contain the list of addressees, while the message description is written a single time in the table MSG-BOX-DESC.

The system also includes a data management module (370), which stores the relational tables in the data base, such as ORACLE, in order to represent the definitions, relations, and attributes of all the procedures, activities, jobs, roles and actors.

The modules (30-37) of the server (3) communicate through the communications system, including the elements (36, 2, 17, 16) with a client module consisting of a set of modules (10-15). These modules will be described below.

The server system (3) communicates through a network (1) and a network server (364) with a client system (2), including a communications interface (27) and a four-layer architecture, the first layer of which is the system of work flow messages (26), the second layer (24) is made up of different sets of client applications program interfaces (241, 242, 243, 244), a third management service layer (25) (251, 252, 253, 254), and a fourth layer (20, 21), which is the topmost interface layer. The various modules of a layer are not in interaction among one another.

The work flow message system (26) enables exchanges of information between the clients and the server.

The information exchanged is transported by a specific structure called a "message". This layer meets the following functionalities: connection with the communications layer of the server (364), disconnection from the communications layer of the server, and sending and receiving messages.

The connect function enables making a permanent link with the server (36). A work station can support a single link. For that purpose, all the messages that are exchanged by the sending and receiving functions pass through this link.

A message is made up of an envelope portion and a data portion. The envelope portion contains the sender, the addressee and the status information, while the data portions contains the contents of the message, which contents have been explained above.

The message system (26) has no awareness whatever of the subject of the contents of the message, nor of the envelope, and even less of the data. This module sends the envelope portion and the file name, which contains the data portion, through the link made with the server, while the file of the data portion is already in the shared file system (372), which is shared with all the work stations and the server.

The interactions among the modules are facilitated by the communications subsystem (27, 1, 36), which authorizes the exchanges of messages among the modules of the system and also among the users. This system supports both synchronous communications (such as fetchtask) and asynchronous communications (such as sendto). The interactions of these communications are employed by the various layers of the communications protocol, and the router (360) plays the role explained above among the clients, each workstation (2), and the servers (message box (35), dispatcher (33), notifier (34), sequencer (30)).

Further modifications within the competence of one skilled in the art are also within the spirit and scope of the invention.

ANNEX 1

```
typedef struct_WFmsg
{
    char reserved[8];              /* Reserved for Internal Host Usage        */
/* Main functional part */
    long id;                       /* Message Id.                             */
    long sessionId                 /* Cli Session Id. (by Router connection   */
    long srvSessionId              /* Srv Session Id. (by Router connection   */
    short isRequest;               /* < > 0 for Request, = 0 for Answer       */
    short synchronous;             /* < > 0 if sync., = 0 if async.           */
    long type;                     /* Type of Message Request or Answer       */
    long priority;                 /* Request Priority (0-100)                */
    long status;                   /* Answer return code, 0 if no error       */
    long senderUserId;             /* User Id. of Message Sender              */
    long destUserId;               /* User Id. of Message Addressee           */
    tWFfileName fileName;          /* Data File name (WKF_HOME relative)      */
                                   /* Just a flag if through network          */
                                   /* 128 bytes length                        */
/*--- Administrative part ---*/
    tWFdate creationDate;          /* Creat Date FlowPATH format (12 bytes)   */
    long cpuTime;                  /* Request CPU time in 1/100 second        */
    long realTime;                 /* Request Real time in 1/100 Second       */
/*--- Application specific part, avoid if possible ---*/
    long parameters[10];           /* To transmit very spec. low-level data   */
/*--- Unusued part ---*/
    char Unused[24];               /* Reserved for future use                 */
} tWFmsg;
```

ANNEX 2A

```
        While (1)
        {
                WFsvReceiveMessage(&message);    /* Read request message */
                                                 /* from the Router's Queue. */
3602            if (message.id == -1)
3603                    WFsvGenerateMessageNewId(&message);
        /*---   Case of a Request direct to the Router ---*/
        /*---   Connection / Disconnection for instance ---*/
                if   (message.isRequest == WF_TRUE &&
                      message.desUserId == WF_ROUTER_USER_ID)
                {
                /*---   Process Request (Router API). ---*/
                        switch (message.type)
                        {
                                case XXX :
                                {
                                /*---  Parameters IN and OUT declaration ---*/
                                    ...
                                /*---  1 : Parameters IN retrieval from message ---*/
                                    ...
                                /*---  2 : Call the Router API ---*/
                                    WFsvXxx(paraCom, paraIn ..., ¶Out ...);
                                /*---  3 : Parameters OUT storage in message ---*/
                                    ...
                                    break;
                                }
                        }
                WFsvRouteAnswerToClient(&message);    /* Write answer Message */
                                                      /* in Client's Queue. */
                }
```

ANNEX 2B

```
        /*---   The normal Routing Case ---*/
                else
                {
                /*---   Case of a Request to a Server ---*/
```

-continued

ANNEX 2B

```
3604        if (message.isRequest == WF_TRUE)
            {
            /*---  The Routing choice ---*/
                   WFsvChooseServerInstance(&serverInstance);
3606        /*--- Write request Message in the Server's Queue. ---*/
                   WFsvRouteRequestToServer(&message, serverInstance);
            /*--- Case of Asynchronous Request, sends ACK to Client ---*/
                   if (message.asynchronous == WF_FALSE)
                   /*--- Write ACK Message in the Client's Queue. ---*/
3612               WFsvRouteAckToClient( );
            }
    /*---   Case of an Answer to a Client ---*/
            else
3608        /*--- Sends Answer only if message is synchronous ---*/
                   if (message.synchronous == WF_TRUE)
                   /*--- Write Message in the Client's Queue. ---*/
3610               WFsvRouteRequestToClient(&message);
            }
    }
```

ANNEX 3A

```
WFcXxx(paraCom, paraIn ..., ¶Out ...)
{
/*--- 1 : Parameters IN store in message ---*/
    ...
/*--- 2 : Message System Call : Write request, read answer ---*/
    WFuaCallServer(&message);   /*if on PC     */
    /* WFsvCallServer(&message);     if on the Host */
/*--- 3 : Parameters OUT retrieve from message ---*/
    ...
}
```

ANNEX 3B

```
While (1)
{
/*---   Remote from Station ---*/
        WFsvReceiveRequestFromStation(&message);
/*---   Write request, read answer ---*/
        WFsvCallServer(&message);
/*---   Remote to Station ---*/
        WFsvSendAnswerToStation(&message);
}
```

ANNEX 3C

```
While (1)
{
3810    WFsvReceiveRequest(&message);  /* Read request message */
                                       /* from the Server's Queue. */
3811 /*--- Process Request (Server API), could there become Client. ---*/
        switch (message.type)
        {
            case XXX :
            {
            /*--- Parameters IN and OUT declaration ---*/
                ...
3812        /*--- 1 : Parameters IN retrieval from message ---*/
                ...
3813        /*--- 2 : Call the Server API (same prototype as
                       Client) ---*/
                WFsvXxx(paraCom, paraIn ..., ¶Out ...);
3814        *--- 3 : Parameters OUT storage in message ---*/
                ...
                break;
        }
```

ANNEX 3C

```
3815 /*--- If Synchronous Answer, Write Answer to Router's Queue ---*/
        if (message.synchronous == WF_TRUE)
            WFsvSendAnswer(&message);
        else           /* Asynchronous */
        {
        /*---   If Answer expected, call Message Box Client API ---*/
3816        if (message.expectsAnswer == WF_TRUE)
                WFcWriteMessage(storage, &message)
        /*---   In any Asynchronous case, send Ack to Router ---*/
3817        WFsvSendAckToRouter( );
        }
}
```

We claim:

1. A device for communication between at least one client and at least one server which are exchanging messages, comprising a router (360), means connecting the router to said at least one client and said at least one server for routing messages between said at least one client (361, 2) and said at least one server (381, 382, 35) with the aid of three message queues, said three message queues including:
   a first queue (3601) stored in the router (360) for enabling storage of messages received from said at least one client or said at least one server;
   a second queue (381) stored in said at least one server for enabling reading of messages including requests directed to said at least one server (38, 35);
   a third queue (392) stored in said at least one client (39) for enabling reading response messages from said at least one server, each of said messages including a field indicating whether a query or response is involved,
   the router (360) including means for generating a message identifier for said at least one server (38, 35) and said at least one client (39), and
   means for writing at the connection with the router a field in the message (Session Id) identifying the client session, and means for writing in other fields of the message (SRV Session Id) information identifying the server session at the connection of a server with the router.

2. The device of claim 1, wherein the client includes means for generating a message identifier for the router.

3. The device of claim 1, wherein said at least one server (38, 35) includes means for generating a message identifier for the router (360).

4. The device of claim 1, wherein each of said messages includes a priority field indicating a degree of priority of said query.

5. The device of claim 1, wherein each of said messages includes a priority field indicating a degree of priority of said query.

6. The device of claim 5, wherein each of said messages includes a status field indicating a status of said message via a return code.

7. The device of claim 1, wherein each of said messages includes a status field indicating a status of said message via a return code.

8. A device for communication between at least one client and at least one server which are exchanging messages, comprising a router (360), means connecting the router to said at least one client and said at leash one server for routing message between said at least one client (361, 2) and said at least one server (381, 382, 35) with the aid of three message queues, said three message queues including:

a first queue (3601) stored in the router (360) for enabling storage of messages received from said at least one client or said at least one server;

a second queue (381) stored in said at least one server for enabling reading of messages including requests directed to said at least one server (38, 35);

a third queue (392) stored in said at least one client (39) for enabling reading response messages from said at least one server, each of said messages including a field indicating whether a query or response is involved and the router (360) including means for generating a message identifier for said at least one server (38, 35) and said at least one client (30–39).

9. The device of claims 8, wherein said at least one server (38, 35) includes means for generating a message identifier for the router (360).

10. The device of claims 8, wherein said at least one server (38, 35) includes means for generating a message identifier for the router (360).

11. The device of claim 8, wherein the message includes a first field of two eight-bit bytes indicating whether communication is synchronous or asynchronous and a second field of two eight-bit bytes to indicate whether the message is a response or a request, by assigning said second field a value 0 or a value other than 0, respectively.

12. The device of claim 11, wherein the message includes a third field of four eight-bit bytes identifying a user who sent the message.

13. The device of claim 11, wherein the message includes a field of four eight-bit bytes identifying an addressee of the message.

14. A method for processing synchronous requests between a client and a server in communication through a router, said method including the steps of:

sending a message by the client to a first queue (3601) of the router;

determining by the router whether the message is a request or a reply;

sending a message by the router with an identifier to a second queue (351, 381) assigned to the server;

sending an acknowledgement message to the client with an identifier after receiving a response in the first queue of the router and enabling the client to retrieve a response from the first queue (3601) of the router.

15. The method of claim 14, wherein the client is itself a server.

16. The method of claim 14, wherein the server is a client of a different server in a synchronous or asynchronous mode.

17. The method of claim 14, wherein each message includes a field of two eight-bit bytes indicating whether the communication is synchronous and a field of two eight-bit bytes to indicate whether the message is a response or a request.

18. The method of claim 14, wherein each message includes a field of four eight-bit bytes identifying a sender of the message.

19. The method of claim 14, wherein each message includes a field of four eight-bit bytes identifying an addressee of the message.

20. A method for processing asynchronous requests between a client and a server in communication through a router, said method including the following steps:

sending a request message by the client to a first queue (3601) of the router with a first identifier;

sending a request message by the router with a second identifier to a second queue (351, 381) of the server (35, 38), acknowledging by the router to the client reception of the request message, and acknowledging by the server reception to the router by sending the second identifier to the first queue (3601) of the router (360); and sending a message by the server with the second identifier to the first queue (3601) of the router once the server has prepared a response, the message including a field to indicate whether the message is a response or a request.

21. The method of claim 20, further including the steps of sending a message by the router to the second queue (351) of the server (35), sending a first acknowledgement from the server to the router (360) and sending a second acknowledgement from the router to the server (381).

22. The method of claim 20, further including the steps of retrieving a response by the client by sending a request message (fetch-message) to the first queue (3601) of the router, transmitting by the router said message to the second queue of the server (35), sending a response by the server to the first queue of the router and retransmitting by the router the response to the client.

23. The method of claim 20, further including the steps of sending by the client a message to the first queue (3601) of the router (360), and comparing by the router a value of the message identifier with the value "–1", in order to either calculate a new message identifier if the value is "–1", or to retransmit the message identifier received to the client if the value is other than "–1".

24. The method of claim 20, wherein the message includes a field of two eight-bit bytes indicating whether the communication is synchronous or asynchronous and a field of two eight-bit bytes to indicate whether the message is a response or a request.

25. The method of claim 24, wherein the message includes a field of four eight-bit bytes for identification of a sender of the message.

26. The method of claim 24, wherein the message includes a field of four eight-bit bytes for identification of an addressee of the message.

* * * * *

UNITED STATES PATENT AND TRADEMARK OFFICE
CERTIFICATE OF CORRECTION

PATENT NO. : 5,699,523
DATED : DECEMBER 16, 1997
INVENTOR(S) : LI ET AL

It is certified that error appears in the above-indentified patent and that said Letters Patent is hereby corrected as shown below:

Claim 8, line 16, "at leash" should read ---at least---

Signed and Sealed this

Nineteenth Day of May, 1998

Attest:

BRUCE LEHMAN

*Attesting Officer*  *Commissioner of Patents and Trademarks*